United States Patent
Sasaki

(10) Patent No.: US 11,214,193 B2
(45) Date of Patent: Jan. 4, 2022

(54) VEHICLE, SOUND CONTROL DEVICE, AND COMPUTER READABLE RECORDING MEDIUM

(71) Applicant: Toyota Jidosha Kabushiki Kaisha, Toyota (JP)

(72) Inventor: Akira Sasaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/077,230

(22) Filed: Oct. 22, 2020

(65) Prior Publication Data

US 2021/0138958 A1 May 13, 2021

(30) Foreign Application Priority Data

Nov. 7, 2019 (JP) .............................. JP2019-202559

(51) Int. Cl.
*B60Q 9/00* (2006.01)
*G01S 13/931* (2020.01)
*G08G 1/16* (2006.01)
*G06K 9/00* (2006.01)

(52) U.S. Cl.
CPC .............. *B60Q 9/00* (2013.01); *G08G 1/163* (2013.01); *G06K 9/00805* (2013.01)

(58) Field of Classification Search
CPC ...................................................... B60Q 9/00
See application file for complete search history.

(56) References Cited

U.S. PATENT DOCUMENTS

| | | | |
|---|---|---|---|
| 10,325,499 B2 | 6/2019 | Tayama et al. | |
| 2006/0001532 A1* | 1/2006 | Nagata | B60Q 9/008 340/438 |
| 2012/0166042 A1* | 6/2012 | Kokido | B60Q 5/008 701/36 |
| 2018/0033307 A1* | 2/2018 | Tayama | H04S 7/00 |
| 2019/0052967 A1* | 2/2019 | Kim | B60Q 9/00 |
| 2020/0298414 A1* | 9/2020 | Ogawa | B25J 9/1664 |
| 2020/0398743 A1* | 12/2020 | Huber | B60R 21/34 |

FOREIGN PATENT DOCUMENTS

JP 2016-151770 A 8/2016

\* cited by examiner

*Primary Examiner* — Joseph H Feild
*Assistant Examiner* — Pameshanand Mahase
(74) *Attorney, Agent, or Firm* — Dinsmore & Shohl LLP

(57) ABSTRACT

A vehicle includes a processor including hardware, the processor being configured to: determine a type of a detection object approaching the vehicle; determine whether or not the detection object enters a predetermined range around the vehicle; and control an output of a sound corresponding to the type of the detection object when the detection object enters the predetermined range.

17 Claims, 2 Drawing Sheets

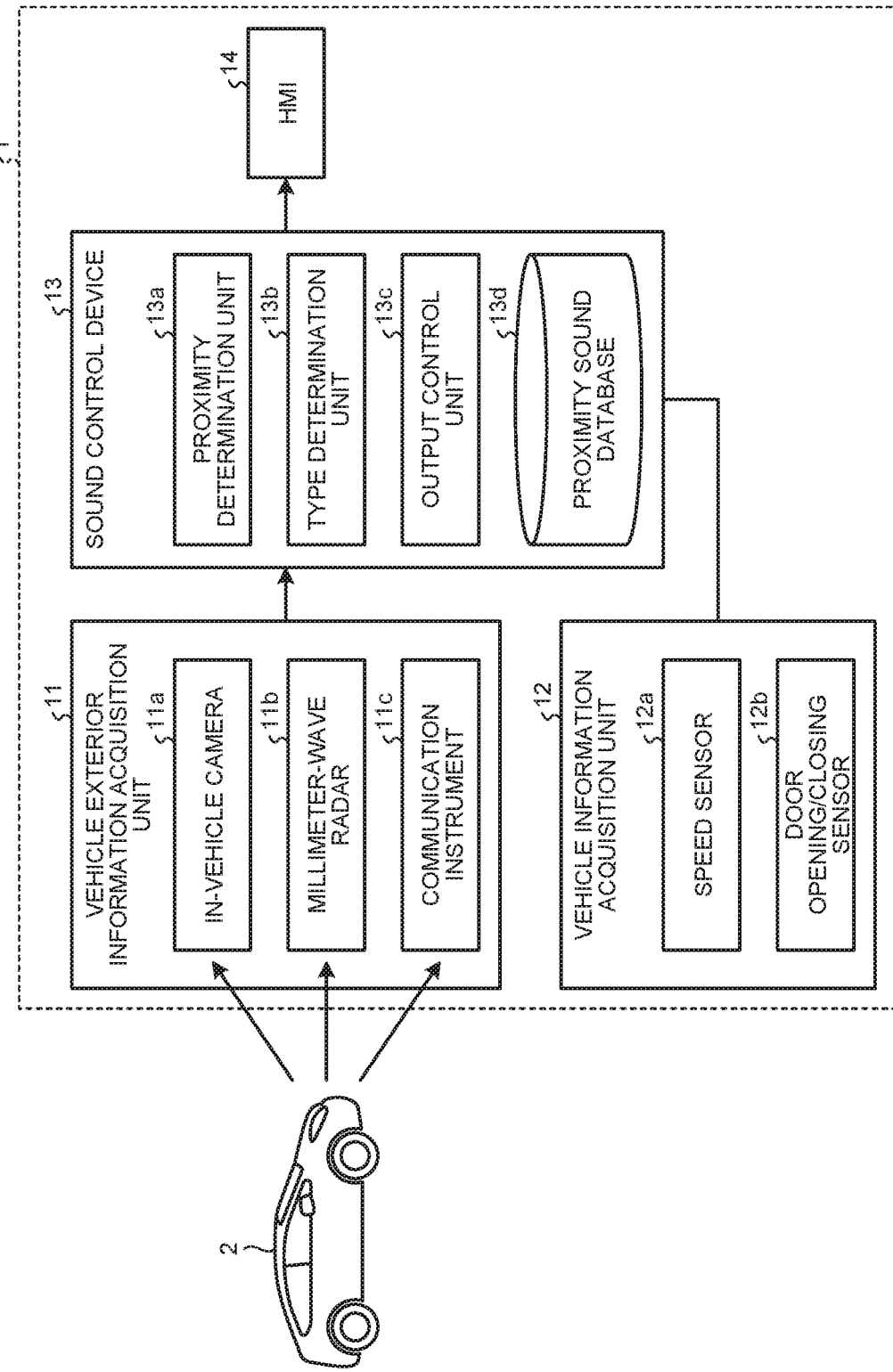

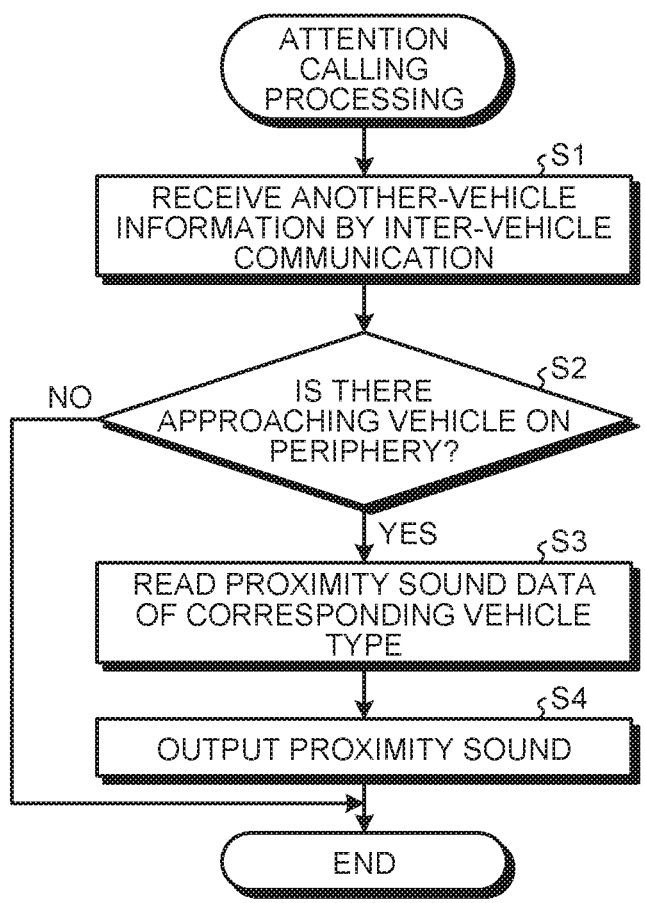

VEHICLE, SOUND CONTROL DEVICE, AND COMPUTER READABLE RECORDING MEDIUM

CROSS-REFERENCE TO RELATED APPLICATIONS

The present application claims priority to and incorporates by reference the entire contents of Japanese Patent Application No. 2019-202559 filed in Japan on Nov. 7, 2019.

BACKGROUND

The present disclosure relates to a vehicle, a sound control device, and a computer readable recording medium.

In Japanese Laid-open Patent Publication No. 2016-151770, a system of providing a driver of a vehicle with presence of approach of a detection object by outputting a warning sound by a surround signal, with which a sound field corresponding to an approaching direction is acquired, when the approach of the detection object to a vehicle is detected in a front, rear, left, or right direction of the vehicle is described.

SUMMARY

There is a need for a technique of enabling a driver of a vehicle to recognize a type of a detection object approaching the vehicle.

According to one aspect of the present disclosure, there is provided a vehicle including a processor including hardware, the processor being configured to: determine a type of a detection object approaching the vehicle; determine whether or not the detection object enters a predetermined range around the vehicle; and control an output of a sound corresponding to the type of the detection object when the detection object enters the predetermined range.

According to another aspect of the present disclosure, there is provided a sound control device including a processor including hardware, the processor being configured to: determine a type of a detection object approaching a vehicle; determine whether or not the detection object enters a predetermined range around the vehicle; and control an output of a sound corresponding to the type of the detection object when the detection object enters the predetermined range.

BRIEF DESCRIPTION

FIG. 1 is a block diagram illustrating a configuration of a vehicle according to an embodiment;

FIG. 2 is a view illustrating an example of proximity sound data stored in a proximity sound database illustrated in FIG. 1; and FIG. 3 is a flow chart illustrating a flow of attention calling processing according to the embodiment.

DETAILED DESCRIPTION

In the following, a vehicle according to an exemplary embodiment will be described in detail with reference to the drawings.

First, a configuration of the vehicle will be described with reference to FIGS. 1 and 2.

FIG. 1 is a block diagram illustrating the configuration of the vehicle according to the embodiment. FIG. 2 is a view illustrating an example of proximity sound data stored in a proximity sound database 13d illustrated in FIG. 1.

As illustrated in FIG. 1, a vehicle 1 according to the embodiment is configured by a known vehicle such as an electric vehicle (EV), a hybrid vehicle (HV), or a fuel cell electric vehicle (FCEV), and includes: a vehicle exterior information acquisition unit 11; a vehicle information acquisition unit 12; a sound control device 13; and a human machine interface (HMI) 14.

The vehicle exterior information acquisition unit 11 acquires information related to a surrounding environment of the vehicle 1 as vehicle exterior information, and outputs an electric signal indicating the acquired vehicle exterior information to the sound control device 13. More specifically, the vehicle exterior information acquisition unit 11 includes: an in-vehicle camera 11a; a millimeter-wave radar 11b; and a communication unit or communication instrument 11c. The in-vehicle camera 11a captures an image of the surrounding environment of the vehicle 1 and outputs data of the captured image to the sound control device 13. The millimeter-wave radar 11b detects an object existing around the vehicle 1, and measures: a position of the detected object; a distance to the detected object; and a relative speed. Then, the millimeter-wave radar 11b outputs an electric signal indicating the measured information to the sound control device 13. The communication instrument 11c acquires information indicating a manufacturer and vehicle type of another vehicle (such as four-wheeled vehicle or two-wheeled vehicle) existing around the vehicle 1 and information indicating a speed and position of the other vehicle through inter-vehicle communication with the other vehicle, and outputs an electric signal indicating the acquired information to the sound control device 13.

The vehicle information acquisition unit 12 acquires various kinds of information indicating a state of the vehicle 1 as vehicle information, and outputs an electric signal indicating the acquired vehicle information to the sound control device 13. More specifically, the vehicle information acquisition unit 12 includes a speed sensor 12a and a door opening/closing sensor 12b. The speed sensor 12a measures a traveling speed of the vehicle 1, and outputs an electric signal indicating the measured traveling speed to the sound control device 13. The door opening/closing sensor 12b detects an open/closed state of a door of the vehicle 1, and outputs an electric signal indicating the open/closed state of the door to the sound control device 13.

The sound control device 13 includes a processor that has hardware and that is, for example, a central processing unit (CPU), a digital signal processor (DSP), or a field-programmable gate array (FPGA), and a storage unit such as a random access memory (RAM) or a read only memory (ROM). The sound control device 13 functions as a proximity determination unit 13a, a type determination unit 13b, and an output control unit 13c by loading a computer program such as a sound control program stored in the storage unit into a work area of the storage unit and executing the computer program. Operations of these units will be described later.

For example, the storage unit may be a recording medium fixed to a computer or the like, or a recording medium that may be detached from the computer or the like. Examples of the recording medium fixed to a computer or the like include an erasable programmable ROM (EPROM) and a hard disk drive (HDD). Examples of the recording medium that may be detached from a computer or the like include a universal serial bus (USB) memory, a flexible disk, a magneto-optical disk, a compact disc-read only memory (CD-ROM), a compact disc-rewritable (CD-RW), a digital versatile disc (DVD), a Blu-ray (registered trademark) disc (BD), a digital audio tape (DAT), an 8 mm tape, and a memory card. A solid state drive (SSD) may be used as a recording medium that may be detached from a computer or the like, or as a recording medium fixed to the computer or the like.

The sound control device 13 includes a proximity sound database 13d that stores proximity sound data for each type of a detection object approach of which to the vehicle 1 is to be detected. Examples of the type of a detection object include an automobile, bicycle, person, animal, and the like. In the present embodiment, as illustrated in FIG. 2, for each manufacturer and vehicle type of the other vehicle (such as two-wheeled vehicle or four-wheeled vehicle) 2 that detects approach of the vehicle 1, the proximity sound database 13d stores, as the proximity sound data, a sound file such as a traveling sound or an engine sound heard in a vehicle interior of the vehicle 1 when the other vehicle approaches the vehicle 1. However, the proximity sound data may be any sound as long as types of detection objects may be distinguished.

The HMI 14 includes an image display device, a sound output device, and the like and outputs an image or sound that may be recognized by a driver of the vehicle 1. In the present embodiment, the HMI 14 outputs various kinds of sound to the vehicle interior of the vehicle 1 according to a control signal from the sound control device 13.

In the vehicle 1 having such a configuration, the sound control device 13 executes attention calling processing described below, whereby the driver of the vehicle 1 may easily recognize a type of a detection object approaching the vehicle 1. In the following, operation of the sound control device 13 in execution of the attention calling processing will be described with reference to FIG. 3.

FIG. 3 is a flow chart illustrating a flow of attention calling processing according to the embodiment. The flow chart illustrated in FIG. 3 is started when an ignition switch of the vehicle 1 is switched from an off state to an on state, and the attention calling processing progresses to Step S1. While the ignition switch of the vehicle 1 is in the on state, this attention calling processing is repeatedly executed each time predetermined time elapses after the previous attention calling processing is ended. The operation of the sound control device 13 in the following is realized by the sound control device 13 executing a computer program.

In processing in Step S1, by inter-vehicle communication using the communication instrument 11c, the sound control device 13 receives information indicating a manufacturer and vehicle type of the other vehicle 2 existing around the vehicle 1 and information indicating a speed and position of the other vehicle 2. As a result, the processing in Step S1 is completed and the attention calling processing progresses to processing in Step S2.

In the processing in Step S2, the proximity determination unit 13a determines whether the other vehicle 2 enters a predetermined range around the vehicle 1 based on the information received in the processing in Step S1. As a result of the determination, when the other vehicle 2 enters the predetermined range around the vehicle 1 (Step S2: Yes), the proximity determination unit 13a progresses the attention calling processing to the processing in Step S3. On the other hand, when the other vehicle 2 does not enter the predetermined range around the vehicle 1 (Step S2: No), the proximity determination unit 13a ends the series of attention calling processing.

In the processing in Step S3, the type determination unit 13b determines a manufacturer and vehicle type of the other vehicle 2 that enters the predetermined range around the vehicle 1 based on the information received in the processing in Step S1. Then, the output control unit 13c reads, from the proximity sound database 13d, proximity sound data corresponding to the manufacturer and vehicle type of the other vehicle 2 which manufacturer and vehicle type are determined by the type determination unit 13b. As a result, the processing in Step S3 is completed and the attention calling processing progresses to processing in Step S4.

In the processing in Step S4, by controlling the HMI 14, the output control unit 13c outputs the proximity sound data to the vehicle interior according to the manufacturer and vehicle type of the other vehicle which manufacturer and vehicle type are read in the processing in Step S3. With such processing, the driver of the vehicle 1 may easily determine a type of a detection object approaching the vehicle 1. Then, the processing in Step S4 is completed and the series of attention calling processing is ended.

As is clear from the above description, the driver of the vehicle 1 may easily recognize a type of a detection object approaching the vehicle 1 since the vehicle 1 according to the embodiment includes the proximity determination unit 13a that determines whether the detection object enters a predetermined range around the vehicle 1, the type determination unit 13b that determines a type of the detection object, and the output control unit 13c that outputs a sound corresponding to the type of the detection object, which type is determined by the type determination unit 13b, when the proximity determination unit 13a determines that the detection object enters the predetermined range around the vehicle 1.

Note that the output control unit 13c may increase volume of the sound as a distance between the vehicle 1 and the detection object becomes shorter. With such processing, the driver of the vehicle 1 may easily recognize approach of the detection object to the vehicle 1.

Also, the proximity determination unit 13a may determine whether a detection object enters a previously-set blind spot range of the driver of the vehicle 1, and the output control unit 13c may output a sound corresponding to a type of the detection object, which type is determined by the type determination unit 13b, when the proximity determination unit 13a determines that the target object enters the previously-set blind spot range of the driver of the vehicle 1. The blind spot range of the driver may be set by a known technology.

Also, when a speed at which a detection object approaches the vehicle 1 is equal to or higher than a first predetermined value, the output control unit 13c may output a sound corresponding to a type of the detection object which type is determined by the type determination unit 13b. Also, when a speed at which a detection object approaches the vehicle 1 changes for a second predetermined value or more, the output control unit 13c may output a sound corresponding to a type of the detection object which type is determined by the type determination unit 13b.

Also, when an open state of a door of the vehicle 1 is detected by the door opening/closing sensor 12b, the proximity determination unit 13a may determine whether a detection object enters a previously-set blind spot range of the door. When the proximity determination unit 13a determines that the detection object enters the previously-set blind spot range of the door, the output control unit 13c may output a sound corresponding to a type of the detection object which type is determined by the type determination unit 13b.

Also, the sound control device 13 may exclude, from a processing object, a detection object reflected on a side mirror or rearview mirror of the vehicle 1. As a result, it is possible to control an output of a sound corresponding to a type of the detection object even when the driver may visually recognize the detection object on the side mirror or rearview mirror of the vehicle 1.

According to the present disclosure, a driver of a vehicle may recognize a type of the detection object approaching the vehicle.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
   a processor comprising hardware, the processor being configured to:
      determine a type of a detection object approaching the vehicle;
      determine whether or not the detection object enters a predetermined range around the vehicle;
      control an output of a sound corresponding to the type of the detection object when the detection object enters the predetermined range, and
      control the output of the sound corresponding to the type of the detection object when a speed at which the detection object approaches the vehicle is a first predetermined value or higher.

2. The vehicle according to claim 1, wherein the processor is configured to increase volume of the sound as a distance between the vehicle and the detection object becomes shorter.

3. The vehicle according to claim 1, wherein
   the detection object is an other vehicle existing around the vehicle, and
   the processor is configured to determine a type of the other vehicle by using inter-vehicle communication.

4. The vehicle according to claim 1, further comprising a database configured to store sound data for each type of the detection object, wherein
   the processor is configured to read sound data corresponding to the type of the detection object from the database and output the read sound data.

5. The vehicle according to claim 1, wherein the predetermined range includes a blind spot range of a driver of the vehicle.

6. The vehicle according to claim 1, wherein the processor is configured to control the output of the sound corresponding to the type of the detection object when the speed changes for a second predetermined value or more.

7. A sound control device comprising:
   a processor comprising hardware, the processor being configured to:
      determine a type of a detection object approaching a vehicle;
      determine whether or not the detection object enters a predetermined range around the vehicle;
      control an output of a sound corresponding to the type of the detection object when the detection object enters the predetermined range, and
      control the output of the sound corresponding to the type of the detection object when a speed at which the detection object approaches the vehicle is a first predetermined value or higher.

8. The sound control device according to claim 7, wherein the processor is configured to increase volume of the sound as a distance between the vehicle and the detection object becomes shorter.

9. The sound control device according to claim 7, wherein
   the detection object is an other vehicle existing around the vehicle, and
   the processor is configured to determine a type of the other vehicle by using inter-vehicle communication.

10. The sound control device according to claim 7, further comprising a database configured to store sound data for each type of the detection object, wherein
    the processor is configured to read sound data corresponding to the type of the detection object from the database and output the read sound data.

11. The sound control device according to claim 7, wherein the predetermined range includes a blind spot range of a driver of the vehicle.

12. The sound control device according to claim 7, wherein the processor is configured to control the output of the sound corresponding to the type of the detection object when the speed changes for a second predetermined value or more.

13. A non-transitory computer-readable recording medium on which an executable program is recorded, the program instructing a processor to execute:
    determining a type of a detection object approaching a vehicle;
    determining whether the detection object enters a predetermined range around the vehicle;
    controlling an output of a sound corresponding to the type of the detection object when it is determined that the detection object enters the predetermined range, and
    controlling the output of the sound corresponding to the type of the detection object when a speed at which the detection object approaches the vehicle is a first predetermined value or higher.

14. The non-transitory computer-readable recording medium according to claim 13, wherein the program instructs the processor to execute increasing volume of the sound as a distance between the vehicle and the detection object becomes shorter.

15. The non-transitory computer-readable recording medium according to claim 13, wherein
    the detection object is an other vehicle existing around the vehicle, and
    the program instructs the processor to execute determining a type of the other vehicle by using inter-vehicle communication.

16. The non-transitory computer-readable recording medium according to claim 13, wherein the program instructs the processor to execute reading, from a database configured to store sound data for each type of the detection object, sound data corresponding to the type of the detection object and outputting the read sound data when it is determined that the detection object enters the predetermined range.

17. The non-transitory computer-readable recording medium according to claim 13, wherein the predetermined range includes a blind spot range of a driver of the vehicle.

* * * * *